United States Patent
Lee et al.

(10) Patent No.: US 7,350,233 B1
(45) Date of Patent: Mar. 25, 2008

(54) FAST RE-ESTABLISHMENT OF COMMUNICATIONS FOR VIRTUAL PRIVATE NETWORK DEVICES

(75) Inventors: Michael Lee, Ottawa (CA); Lakshminath Dondeti, Chelmsford, MA (US); Frank Horsfall, Gloucester (CA)

(73) Assignee: Nortel Networks Limited (CA)

( * ) Notice: Subject to any disclaimer, the term of this patent is extended or adjusted under 35 U.S.C. 154(b) by 671 days.

(21) Appl. No.: 10/716,731

(22) Filed: Nov. 19, 2003

Related U.S. Application Data

(60) Provisional application No. 60/502,452, filed on Sep. 12, 2003.

(51) Int. Cl.
*G06F 15/16* (2006.01)

(52) U.S. Cl. .......................... 726/15; 713/153

(58) Field of Classification Search .............. 726/14, 726/15, 1; 713/151–153
See application file for complete search history.

(56) References Cited

U.S. PATENT DOCUMENTS

| 6,629,248 | B1* | 9/2003 | Stachura et al. ............. 713/340 |
| 6,976,177 | B2* | 12/2005 | Ahonen ........................ 726/3 |
| 2001/0020275 | A1* | 9/2001 | Jari et al. ................... 713/201 |
| 2003/0018908 | A1* | 1/2003 | Mercer et al. .............. 713/193 |
| 2003/0126466 | A1* | 7/2003 | Park et al. .................. 713/201 |
| 2004/0044908 | A1* | 3/2004 | Markham et al. .......... 713/201 |
| 2004/0117653 | A1* | 6/2004 | Shapira et al. ............. 713/201 |

FOREIGN PATENT DOCUMENTS

GB  2389282 A * 12/2003

* cited by examiner

*Primary Examiner*—Gilberto Barrón, Jr.
*Assistant Examiner*—Samson Lemma
(74) *Attorney, Agent, or Firm*—McGuinness + Manaras LLP

(57) ABSTRACT

A method and apparatus has been described that permits fast re-establishment of secure communications between endpoints in a network through intelligent re-use of existing security associations.

17 Claims, 2 Drawing Sheets

FAST RE-ESTABLISHMENT OF COMMUNICATIONS FOR VIRTUAL PRIVATE NETWORK DEVICES

RELATED APPLICATIONS

This application claims priority to previously filed U.S. Provisional application Ser. No. 60/502,452, filed Sep. 12, 2003, entitled "Fast Re-Establishment of Communications for Virtual Private Networks" by Lee et al.

FIELD OF THE INVENTION

This invention relates generally to the field of secure communications and more particularly to a method and apparatus for establishing secure communications between two or more devices.

BACKGROUND OF THE INVENTION

As it is known in the art, Internet Protocol Security (Ipsec) is a set of protocols developed by the Internet Engineering Task Force (IETF) to support secure exchange of packets at the IP layer. IPsec supports two basic modes of operation for encryption services: Transport mode and Tunnel mode. Transport mode encrypts only the data portion (payload) of each packet, but leaves the header untouched. The more secure Tunnel mode encrypts both the header and the payload. On the receiving side, an IPSec-compliant device decrypts each packet.

Because both Transport and Tunnel mode require encryption and decryption of portions of a packet, the sending and receiving devices must share a secret encryption key. IPsec employs a standard and secure mechanism referred to as the Internet Key Exchange protocol (IKE) to exchange keys over a public network. According to the IKE protocol, a common key can be determined at both a sending and receiving device without ever sending the keys themselves over the public network, thereby preventing any eavesdropping device from obtaining access to the key.

The Internet Key Exchange (IKE) protocol is used to establish a 'security association' (SA) between the sending and receiving devices, where a security association is an agreement between communicating peers on factors such as which IPsec protocol version to use, the mode of operation of the protocols (tunnel or transport), cryptographic algorithms and keys, key lifetime, policy statements, etc. SAs can be used for establishing Virtual Private Networks between two or more network devices. In general, SAs are unidirectional; separate SAs are used for inbound and outbound traffic. The granularity of communication protected by a given SA can vary broadly. For example, an SA can be used to protect all communication to a specific receiving device, or alternatively different SAs may be provided to protect different types of communications with the receiving device. Thus it can be appreciated that a given device may store many SAs to protect various communication links.

One problem with the storage of the SAs is that the generation of the keys for each SA can be time consuming. Public key cryptographically based key exchange was invented in 1976 by Whitfield Diffie and Martin Hellman. For this reason, it is sometime called the Diffie-Hellman key exchange. The Diffie-Hellman algorithm allow both endpoints to agree on a private encryption key without ever having to send the key itself over the network. The Diffie-Hellman algorithm accomplishes this by mathematics involving exponentiation of large prime numbers and by sending only intermediate results over the public network. An attacker monitoring the public network would not be able to determine the same key as the communicating endpoints.

An example of the operation of the Diffie-Hellman key exchange will now be described. Assume that two parties, Bob and Alice, want to derive a shared secret key. Bob and Alice communicate over a public network or open communication channel which is not secure. Using the Diffie-Hellman key exchange, Bob and Alice decide on two numbers N and G, which are not secret and can be sent over a public network, where N is a large prime number (the Diffie-Hellman group) and G is a number smaller than N (the "base" or "generator" number). Bob then chooses a random integer I and keeps it private. Thus, I is Bob's private key value.

Bob then calculates a public key ($PK_{Bob}$) equal to $G^I$ mod N. Due to the exponential calculations required by this calculation, it takes some time to calculate Bob's public key. Bob then forwards the $PK_{Bob}$ value to Alice.

Alice chooses a large random integer R and keeps this private (R is therefore equal to Alice's private key). Alice then calculates her public key, $PK_{Alice}$ equal to $G^R$ mod N. Similar to Bob's public key calculation, this calculation is also time consuming. Alice sends the value of $PK_{Alice}$ over to Bob. Bob raises Alice's public key to his large private integer I, resulting in $(G^R \bmod N)^I \bmod N$. Alice raises Bob's public value to her large integer R, resulting in $(G^I \bmod N)^R \bmod N$. Both calculations provide the same result, and therefore provide a shared secret key that can be used to encrypt all further communications between the two.

Thus it can be seen that the IKE algorithm used to generate SA keys between two endpoints, which includes the Diffie-Hellman key exchange as a subcomponent, is computationally complex and can be quite time consuming. During normal operation, the IKE delay does not adversely affect system performance, as IKE sessions are incidental to the establishment of the communication channel, and they occur on demand and at random intervals.

However, because there may be hundreds or thousands of SAs in a given communication network, in the event that a power down condition occurs in the network, and undesirably large time period is undertaken during power up to re-establish the SAs for the endpoints. For larger VPN devices, the time period for establishing connections may be up to one half hour. Such a delay is not desirable to the consumer.

Various solutions have been attempted to minimize this delay, such as adding hardware accelerator hardware to aid in the cryptographic calculations, or pre-calculating some of the regularly used Diffie-Hellman coefficients. However, the hardware solution does not scale well, and the software solution does nothing to address the negotiation and transmission delays incurred in establishing the keys. It would be desirable to identify a method and apparatus that would reduce the time necessary to re-establish secure communication channels in a communications network on power up.

SUMMARY OF THE INVENTION

According to one aspect of the invention, a method for re-establishing secure communications between a node and an endpoint node includes the steps of copying, responsive to a reset at the node, a set of security associations stored in a memory to a working set of security associations, wherein the set of security associations includes only the security associations for endpoints nodes that are trusted by the node.

The method further includes the steps of receiving, at the node, a communication from the endpoint node and determining whether a security association for the endpoint node is included in the working set of security associations. Responsive to a determination that the security association for the endpoint node is in the working set of security associations, the security association is used to process the communication from the endpoint node.

According to another aspect of the invention, a method of re-establishing communication between a node and an endpoint includes the steps of storing an identifier of the endpoint on a trusted endpoint list, negotiating a security association for the trusted endpoint, and storing the security association for the trusted endpoint in a working table of security associations and periodically copying a subset of the working table of security associations to a table of security associations in a memory.

According to a further aspect of the invention, a network device includes security association logic, coupled to the non-volatile memory, for applying security associations to communications received by the network device. The security association logic includes a first memory comprising at least one entry, the entry comprising an endpoint identifier and a security association associated with the endpoint; and a list of trusted endpoints. The network device also includes a second memory, storing a subset of data of the first memory.

With such an arrangement, security associations for trusted endpoints may be stored in an external memory and restored at reset to allow for their fast re-use, without the need to re-negotiate the associations. As a result, the amount of time needed to re-establish secure links following a reset at a node is drastically reduced.

DETAILED DESCRIPTION

Figure 1:
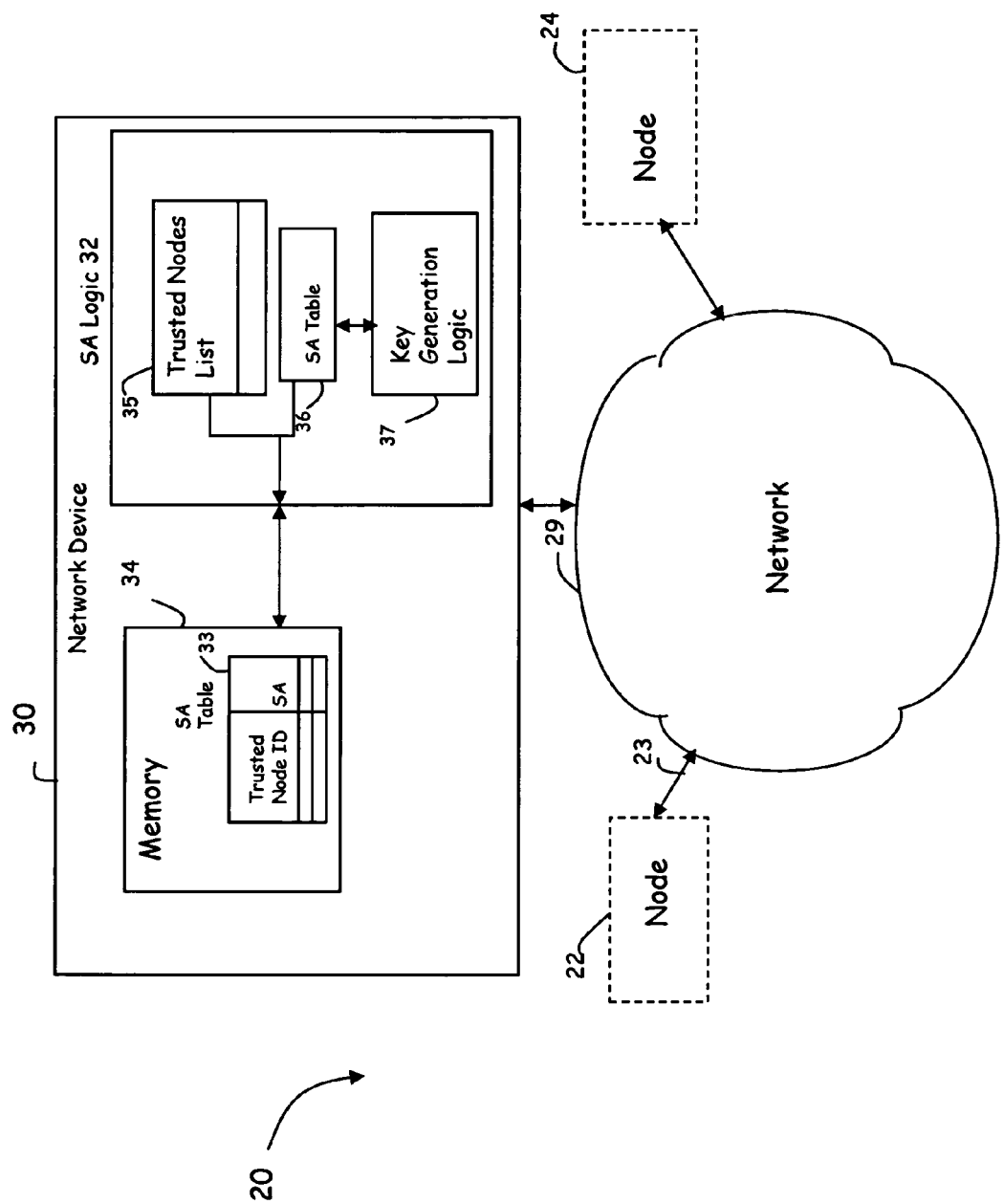
FIG. 1 is a block diagram illustrating exemplary components that may be included in a network device implementing the present invention.

FIG. 1 illustrates a system 20 illustrating a number of member nodes 22, 24 and 30 coupled via a communications network 29. The system of FIG. 1 is a generic system, and the members may be any type of device that is capable of receiving controlled data content, including a television, computer, wire-less device, etc. Thus, the network 29 may be any type of network, whether it is cable based, ISDN based, wireless or some combination thereof operating according to any communication protocol. Exemplary member nodes include, for example, members of a private computer network who share a private network, or cable consumers who receive content via a pre-paid service arrangement, such as pay-per-view, etc.

Node 30 is shown in more detail to include various components that may be used to implement the present invention. The node 30 also includes other components that enable network communication such as a network interface card, central processing unit, etc, although these components have not been shown for purposes of clarity. Node 30 includes SA logic 32 and a memory 34. The memory 34 of the present invention includes any arrangement of one or more memory devices capable of retaining its contents during a power fail, such as an external memory, or a non-volatile on module storage device such as an EEPROM. Stored in the memory 34 is a security association (SA) table 33. The SA table 33 includes one or more entries, with each entry storing an identifier of a communication link for node 30, and a security association enabling communication over the link. The identifier of the communication link may be a node identifier, or alternatively may be a group identifier, identifying a group of nodes, for example, who are members of a private network. As will be described in more detail below, one entry is stored in the SA table for each 'trusted endpoint' to which the node 30 communicates.

The memory 34 receives the SA and identifier information from SA logic 32. SA logic 32 is shown to include a trusted nodes list 35, a security association table 36 and key generation logic 37. In one embodiment, the key generation logic operates using the Internet Key Exchange (IKE) protocol, although any other types of key exchange protocols may alternatively be used, and it is important to note that the present invention is not limited to any particular method of key generation. That is, the invention is useful in any situation in which a shared key is used to exchange data between two or more devices. It should be understood that the components of FIG. 1 are meant to represent functional components that may be implemented in hardware, software or some combination thereof.

As described above, when establishing secure communication between a pair of devices, the various steps of the key generation logic are performed to obtain the key, as well as the modes of operation, cryptographic algorithms, and key lifetime, also collectively referred to herein as the security association (SA). Once the SA has been obtained, it is stored in the SA table 36, and is used during subsequent communications until changed or discarded. The SA table 36 stores a number of entries, each entry including an identifier of the communication link, and the SA associated with the communication link. As mentioned previously, the identifier may be a node identifier or a group identifier (for example a VPN identifier). The SA table 36 is a superset of the SA table 33 stored in memory 34.

Also included in the SA logic 32 is a list of trusted endpoints 35. The list of trusted endpoints is a list of links (comprised of node identifiers or group identifiers) which are 'trusted' by the node 30; i.e., those endpoints that are well known to the node and communicate with the node on a regular basis, and thus will be allowed to 're-use' their last negotiated security association in the event of a power reset at the node.

The selection of endpoints as 'trusted' endpoints that are permitted to re-use their security association depends upon the particular policy that a corporation or enterprise that owns the network sets up, and is flexible and tailored to the particular needs of the corporation. For example, certain fixed end nodes such as branch offices or remote offices which should always normally be connected to the corporation via a VPN could be designated as 'always trusted' by the reuse policy. The remote offices are intended to be normally connected to the network via the VPN, are well known and fixed, and may be able to always use the fast re-use of security associations. In addition, telecommuters who log on regularly to the corporation may be designated as trusted depending on a configurable rules set based on the number of times and durations of connections in a past time period. For example, some re-use policy rules which can be set up to consider a telecommuter as trusted include, but are not limited to: certain telecommuters who are registered with the system administrator as a full time home worker; telecommuters who log on, for example, at least once a day for a certain predetermined number of days, and telecommuters who log on for a minimum time duration within a specified time window, etc. Re-use policies can also be flexible depending upon the amount of traffic the VPN is handling; for example, if the traffic load is light and not many users are using the communications channels, the policy may specify that a full IKE exchange should be used in the event of a power down, and thus the endpoint is removed from the list of trusted endpoints.

Thus, using the criteria above it can be seen that the selection of which endpoints may be placed on the trusted list may happen automatically (for example, after a certain number of established communications with the node) or may occur by having the endpoint request trusted status from the node.

The list of trusted endpoints is used to select a subset of entries from the SA table 36 for maintenance the SA table 33 of memory 34. Periodically the entries from the SA table 36 are copied to the SA table 33. This copying may occur upon the creation or re-keying of each SA, or alternatively the table may be backed up at periodic intervals to reflect changes in network configuration.

The SA logic 32 takes advantage of the fact that certain endpoints are well known to each node. These endpoints are allowed a very fast but secure method to re-establish communications with the node in the event of a power failure at the node. According to one aspect of the invention, the trusted endpoints are permitted to use the last previously negotiated security association between the node and the endpoint providing that the endpoint is one indicated in the trusted list 35. Thus, in the event of a power fail at the node 30, the contents of the SA table 36 and trusted list 35 are lost. During reboot, the values from the SA table 33 in memory 34 are copied back into the SA table 36 and trusted list 35. When the trusted endpoints next seek access to the node, they prove their identity by using the last previously negotiated SA to communicate with the node. If the SA used by the trusted endpoint corresponds to the one retrieved from memory, the endpoint is permitted to communicate immediately with the node, without having to undergo the time consuming process of re-keying the communication link. Only in the event that the SA does not match the retrieved SA from memory does the endpoint need to re-negotiate keys with the node. As a result, considerable time is saved upon power up by permitting previously negotiated SAs to be used with trusted endpoints.

Figure 2:
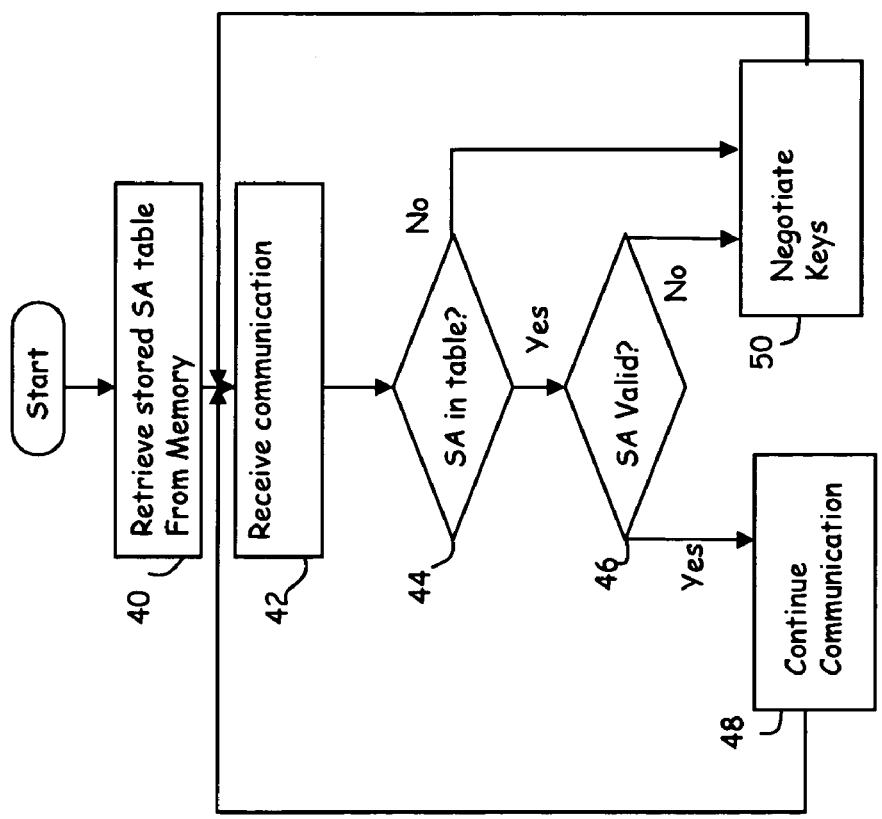
FIG. 2 is a flow diagram illustrating exemplary steps that may be take in the present invention to re-establish secure communications between endpoints in the event of a power fail.

Referring now to FIG. 2, a flow diagram of the process that occurs at the node following reset at the node will now be described. At step 40, upon power reset the contents of the SA table 33 are retrieved from memory 34 and copied to the SA table 36. In addition, the trusted endpoint identifiers are copied to the trusted endpoint table 35. As a result, the SA table 36 stores, at power up, only the SAs for the trusted endpoints; all other endpoints that subsequently request communications with node 30 need to re-negotiate SAs.

At step 42, a communication is received from an endpoint. At step 44 it is determined whether the identifier of the communication is a trusted endpoint, and therefore whether the SA for the identifier exists in the table 36. If there is no SA in the table 36 for the identifier, then the process proceeds to step 50 where an SA is negotiated for the particular endpoint. If, however, at step 44 it is determined that there is an SA in the table 36 for the endpoint, then at step 46 it is determined whether the communication from the endpoint is valid. This is determined by applying the known SA for the endpoint to the communication, and determining whether or not the communication is error free. For example, the communication is decrypted using the known SA key for the endpoint to determine whether the communication contains valid data.

If the communication is not valid, then the trusted endpoint is forced to re-negotiate the SA for the link, and the process proceeds to step 50. If the communication is valid, at step 48 it is processed, and the process returns to step 42 to await another communication.

The process of receiving communications from the endpoints (trusted and other) continues until the SA table is rebuilt. Only those endpoints that are not trusted, or that are trusted but did not use a valid SA are forced to undergo the process of key negotiation. By reducing the number of endpoints that need to undergo the time consuming process of key re-negotiation, the present invention provides a fast method for re-establishing communications in a secure environment.

In one embodiment of the invention, after the VPN has come back up after a reset and all endpoints are communicating as per this invention, the VPN could force each of the "trusted endpoints" allowed to communicate quickly in turn to re-authenticate, that is, perform the full IKE exchange. This would only happen over time though and when the VPN is not heavily loaded. Having the endpoints re-authenticate will provide what is called "perfect forward security" whereby a 100% new security association including all key is negotiated.

Thus a method and apparatus has been described that permits fast re-establishment of secure communications in the event of a power fail. Although the above embodiment has generically described a 'node', it should be understood that the logic within this node may be used in a variety of environments. For example, the node may be a server in a head office in a hub-and-spoke network, where several branch offices' VPNs terminate. If the head office is a financial or investment institution, it may store thousands of SAs. The present invention would reduce the impact of a power fail by the server by permitting the trusted endpoints to re-use their security associations. Alternatively, the node may be a remote access server (RAS) serving a number of telecommuting clients for a large corporation. In addition, the node may be a personal computer running an extranet client to access corporate services. If the PC needs to be re-booted, it would be advantageous to save the SA state at the PC to enable it to re-establish the remote access process quickly. Thus it can be seen that the present invention may be used in a variety of configurations and environments.

One embodiment of a method and apparatus for fast re-establishment of secure communications through security association re-use has been shown and described. Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk)_. Having described various embodiments of the invention, it is understood that the present invention should not be limited to any specific disclosure herein, but rather is embodied in the spirit and scope of the claims attached hereto.

The invention claimed is:

1. A method for re-establishing secure communications between a node and an endpoint node including the steps of:
    copying, responsive to a reset at the node, a set of security associations stored in a memory to a working set of security associations, wherein the set of security associations includes only the security associations for a set of trusted endpoint nodes, the set of trusted endpoint nodes determined according to a security association re-use policy of the node, wherein the security association re-use policy controls the set of trusted end-points to comprise only end-points that are known to the node and communicate with the node on a regular basis;
    receiving, at the node, a communication from the endpoint node;
    determining whether a security association for the endpoint node is included in the working set of security associations;
    responsive to a determination that the security association for the endpoint node is in the working set of security associations, using the security association to process the communication from the endpoint node.

2. The method of claim 1, further including the step of verifying if the communication from the endpoint node is valid.

3. The method of claim 2, further including the steps of:
    obtaining a new security association for the endpoint node responsive to a determination that the communication from the endpoint node is not valid; and
    storing the new security association for the endpoint node in the working set of security associations.

4. The method of claim 1, further including the steps of:
    obtaining a new security association for the endpoint node responsive to a determination that the security association for the endpoint node is not included in the working set of security associations; and
    storing the new security association for the endpoint node in the working set of security associations.

5. A method of re-establishing communication between a node and an endpoint including the steps of:
    selectively storing an identifier of the endpoint on a trusted endpoint list according to a re-use policy of the node, wherein the security association re-use policy limits the selection of identifiers for inclusion into the trusted endpoint list to only end-points that are known to the node and communicate with the node on a regular basis;
    negotiating a security association for the endpoint, and storing the security association for the endpoint in a working table of security associations; and
    periodically copying a subset of the working table of security associations to a table of security associations in a memory, wherein the subset of the working table of security associations that is copied to memory is selected according to the trusted endpoint list.

6. The method of claim 5, further comprising the step of:
    in the event of a reset, copying the table of security associations to the working table of security associations.

7. A network device including:
    security association logic, coupled to the non-volatile memory, for applying security associations to communications received by the network device, the security association logic including:
        a first memory comprising at least one entry, the entry comprising an endpoint identifier for each endpoint communicating with the network device and a security association associated with the each endpoint; and
        a list of trusted endpoints, the list of trusted endpoints being determined according to a security association re-use policy of the network device, wherein the security association re-use policy limits the inclusion of end-points in the trusted end-point list to only end-point nodes that are known to the node and communicate with the node on a regular basis; and
        a second memory, storing a subset of data of the first memory, the subset of data selected according to the list of trusted endpoints.

8. The network device of claim 7, wherein the second memory is a non-volatile memory.

9. The network device of claim 7, further comprising means for periodically copying the subset of data of the first memory to the second memory.

10. The network device of claim 9, wherein the subset of data from the first memory that is copied to the second memory is selected responsive to the list of trusted endpoints.

11. The network device of claim 10 wherein only the entries of the first memory having endpoint identifiers that are on the list of trusted endpoints are copied to the second memory.

12. The network device of claim 7, further comprising means, responsive to a reset at the network device, for copying contents of the second memory to the first memory.

13. The method according to claim 1 wherein the security association re-use policy varies in response to network traffic.

14. The method of claim 1 wherein the security association re-use policy always selects identifiers associated fixed end points for inclusion in the trusted endpoint list.

15. The method of claim 1 wherein the security association re-use policy varies in response to network traffic.

16. The network device of claim 7 wherein the security association re-use policy varies in response to network traffic.

17. The network device of claim 7 wherein the security association re-use policy includes end-points that request trusted status.

* * * * *